(12) United States Patent
Kawamura et al.

(10) Patent No.: US 11,407,646 B2
(45) Date of Patent: Aug. 9, 2022

(54) METHOD FOR SYNTHESIZING AMMONIA, AND APPARATUS FOR SAID METHOD

(71) Applicant: National Institute for Materials Science, Ibaraki (JP)

(72) Inventors: Fumio Kawamura, Tsukuba (JP); Takashi Taniguchi, Tsukuba (JP)

(73) Assignee: National Institute for Materials Science, Ibaraki (JP)

( * ) Notice: Subject to any disclaimer, the term of this patent is extended or adjusted under 35 U.S.C. 154(b) by 504 days.

(21) Appl. No.: 16/342,594

(22) PCT Filed: Jun. 28, 2017

(86) PCT No.: PCT/JP2017/023704
§ 371 (c)(1),
(2) Date: Apr. 17, 2019

(87) PCT Pub. No.: WO2018/074009
PCT Pub. Date: Apr. 26, 2018

(65) Prior Publication Data
US 2019/0256367 A1    Aug. 22, 2019

(30) Foreign Application Priority Data

Oct. 19, 2016 (JP) .............................. JP2016-205538

(51) Int. Cl.
*C01C 1/04* (2006.01)
*B01J 23/04* (2006.01)

(52) U.S. Cl.
CPC .............. *C01C 1/0411* (2013.01); *B01J 23/04* (2013.01); *C01C 1/04* (2013.01); *C01C 1/0417* (2013.01)

(58) Field of Classification Search
CPC ....... C01C 1/0411; C01C 1/04; C01C 1/0417; B01J 23/04
See application file for complete search history.

(56) References Cited

U.S. PATENT DOCUMENTS

| 2,138,122 A | * | 11/1938 | Roberts, Jr. | ........... C01C 1/0488 423/353 |
| 2005/0087449 A1 | * | 4/2005 | Denvir | .................... C25B 1/00 205/552 |
| 2006/0169197 A1 | | 8/2006 | Sasaki et al. | |

FOREIGN PATENT DOCUMENTS

WO    2004/083498 A1    9/2004

OTHER PUBLICATIONS

Gardner et al., "Kinetics of the Reactions of Hydrogen, Nitrogen, and Hydrogen/Nitrogen Mixtures with Molten Lithium", J. Phys. Chem. 1981, 85, 2388-2392. (Year: 1981).*
International Search Report issued in corresponding International Patent Application No. PCT/JP2017/023704 dated Aug. 29, 2017.
Masanao, "Ammonia synthesis," Science Net 27: 6-9 (2006).

(Continued)

*Primary Examiner* — Anthony J Zimmer
(74) *Attorney, Agent, or Firm* — Morgan, Lewis & Bockius LLP

(57) ABSTRACT

The purpose of the present invention is to provide a method for synthesizing ammonia and an apparatus for the method. The method for synthesizing ammonia according to the present invention comprises: a step of melting a metal containing at least an alkali metal; and a step of supplying a hydrogen gas and a nitrogen gas to the molten metal.

15 Claims, 5 Drawing Sheets

START

S110   MELTING METAL CONTAINING AT LEAST ALKALI METAL

S120   SUPPLYING HYGROGEN GAS AND NITROGEN GAS TO MOLTEN METAL

(56) References Cited

OTHER PUBLICATIONS

Kawamura et al., "The effects of Na and some additives on nitrogen dissolution in the Ga—Na system: A growth mechanism of GaN in the Na flux method," Journal of Materials Science: Materials in Electronics 16: 29-34 (2005).

Kawamura et al., "Synthesis of ammonia using sodium melt," Scientific Reports 7: 11578 (2017).

International Preliminary Report on Patentability and Written Opinion issued in corresponding International Patent Application No. PCT/JP2017/023704 dated May 2, 2019.

* cited by examiner

METHOD FOR SYNTHESIZING AMMONIA, AND APPARATUS FOR SAID METHOD

TECHNICAL FIELD

The present invention relates to a method for synthesizing ammonia and an apparatus for the same.

BACKGROUND ART

Ammonia is one of the essential chemical substances that has been very widely used for chemical fertilizers, explosives, chemicals, and the like. A production volume of ammonia reaches 160 million tons per year mainly used for chemical fertilizers, and this production volume is still kept on increasing. Although a use of hydrogen as infrastructure has been a recent trend to make low-carbon society reality, storage and transportation of hydrogen is not easy and converting hydrogen to ammonia has thus been a growing trend. In addition to that, ammonia is used in extremely broad areas such as power generation by directly burning ammonia.

Ammonia as mentioned above is widely produced by the Haber-Bosch process at an industrial level. The Haber-Bosch process is a method for synthesizing ammonia using a doubly promoted iron catalyst through a reaction between hydrogen and nitrogen at 400° C. to 600° C. under high pressures of 200 atmospheres to 400 atmospheres (see Non Patent Literature 1, for example). However, since the synthesis needs to be performed under high pressures of more than 200 atmospheres, an expensive apparatus capable of providing such a high-pressure condition is required, which therefore increases a production cost.

A technique of producing single crystals of gallium nitride by the use of an alkali metal as a catalyst has been known (see Patent Literature 1 and Non Patent Literature 2, for example). According to Patent Literature 1 and Non Patent Literature 2, bringing a nitrogen gas in contact with a molten alkali metal causes its nitrogen to change into a nitrogen radical or a nitrogen ion which has an improved reactivity. By making use of this, single crystals of gallium nitride are produced in these literatures. However, studies on a technique of applying the above findings to a field other than the production of the single crystals of gallium nitride have not yet been well conducted.

CITATION LITERATURE

Patent Literature

Patent Literature 1: WO2004/083498 A1

Non Patent Literature

Non Patent Literature 1: Masanao Ezaki, Science Net, volume No. 27, September 2006, page 6-9
Non Patent Literature 2: F. Kawamura, Journal of Materials Science: Materials in Electronics, 16, 2005, 29-34

SUMMARY OF INVENTION

Technical Problem

An object of the present invention is to provide a new method for synthesizing ammonia and an apparatus for the same. Particularly, the object of the present invention is to provide a method in which ammonia can be synthesized even under lower pressures, preferably under atmospheric pressure (which is also referred to as "pressure of 1 atmosphere" in the present application), than that of a conventional method in which the synthesis of ammonia is required to be performed under high pressures, and an apparatus for the same.

Solution to Problem

As a result of intensive studies in view of the above object, the inventors have found that an alkali metal functions as a catalyst when synthesizing ammonia, which surprisingly makes ammonia synthesis possible even under atmospheric pressure.

A method for synthesizing ammonia according to the present invention includes the following steps: a step of melting a metal containing at least an alkali metal; and a step of supplying a hydrogen gas and a nitrogen gas to the above molten metal. The above object can be achieved by this method.

The above alkali metal may be at least one metal selected from the group consisting of lithium, sodium, potassium, rubidium, cesium, and francium. Among these metals, a metal containing at least sodium is particularly preferable.

The above alkali metal may contain at least sodium.

The above hydrogen gas and the above nitrogen gas may satisfy a range from 2:98 (by volume ratio) to 98:2 (by volume ratio) (namely, a range between 2:98 or more (by volume ratio) and 98:2 or less (by volume ratio)).

The above hydrogen gas and the above nitrogen gas may satisfy a range of 25:75 (volume ratio) to 90:10 (volume ratio) (a range between 25:75 or more (volume ratio) and 90:10 or less (volume ratio)).

The above supplying step may be performed under pressure in a range from 1 atmosphere or more to less than 200 atmospheres.

The above supplying step may be performed under pressure in a range from 1 atmosphere or more to less than 20 atmospheres.

The method for synthesizing ammonia according to the present invention may further include the step of cooling and collecting gas generated in the above supplying step.

The above melting step may be performed by melting the above metal at a temperature range from higher than 530° C. to 600° C. or lower, and the above supplying step may be performed under pressure of 1 atmosphere.

In the above melting step, melting the above metal and stirring the above molten metal may be performed at the same time. A pressure for performing the above melting step is not particularly limited in the present invention, and may be performed under pressure of 1 atmosphere.

In the above supplying step, the above hydrogen gas and the above nitrogen gas may be supplied in the form of bubbles.

The method for synthesizing ammonia according to the present invention may further include the step of recovering the above alkali metal evaporated in the process of synthesizing the ammonia and/or a reaction product of the above alkali metal and the above hydrogen gas, generated in the process of synthesizing the ammonia.

An apparatus for synthesizing ammonia according to the present invention includes a vessel for keeping a metal containing at least an alkali metal, a heating means for heating the above vessel to melt the above metal kept in the above vessel, and a gas supplying means for supplying a hydrogen gas and a nitrogen gas to the above heated and molten metal. The above object can be also achieved with this apparatus.

The apparatus for synthesizing ammonia according to the present invention may further include a stirring means for stirring the above molten metal.

The apparatus for synthesizing ammonia according to the present invention may further include a bubbling means for making the above hydrogen gas and the above nitrogen gas into bubbles.

The above vessel may be housed in a high-pressure equipment that controls pressure in the vessel.

The above vessel may be made of boron nitride.

The above heating means may be selected from the group consisting of resistance heating, light-concentrating heating, radio-frequency heating, and combustion heating.

The apparatus for synthesizing ammonia according to the present invention may include one or more recovery tanks for collecting ammonia.

One of the above one or more recovery tanks may recover the above alkali metal evaporated in the process of synthesizing ammonia and/or a reaction product of the above alkali metal and the above hydrogen gas, generated in the process of synthesizing ammonia.

Advantageous Effects of Invention

In the method for synthesizing ammonia according to the present invention, ammonia can be synthesized even under atmospheric pressure by the use of at least an alkali metal as a catalyst. Thus, a specific high-pressure equipment that is necessary for a conventional method in which ammonia is synthesized under high pressure of 200 atmospheres or more is no longer required, which thus reduces a production cost. Further, by the use of at least an alkali metal as a catalyst, oxygen and water like impurities easily react with the catalyst and are removed. As a result, high-purity ammonia can be synthesized.

The apparatus for synthesizing ammonia according to the present invention includes the vessel, the heating means, and the gas supplying means. This vessel may be a vessel that can keep at least an alkali metal and does not require a high-pressure resistant vessel that is necessary for the conventional method in which ammonia is synthesized under high pressures. Therefore, ammonia can be synthesized without using any high-pressure equipment, and a cost for the apparatus can be thus reduced.

DESCRIPTION OF EMBODIMENTS

Hereinafter, embodiments of the present invention will be described with reference to the drawings. The same constituent elements will be given the same reference number, and descriptions thereof will be omitted.

Figure 1:
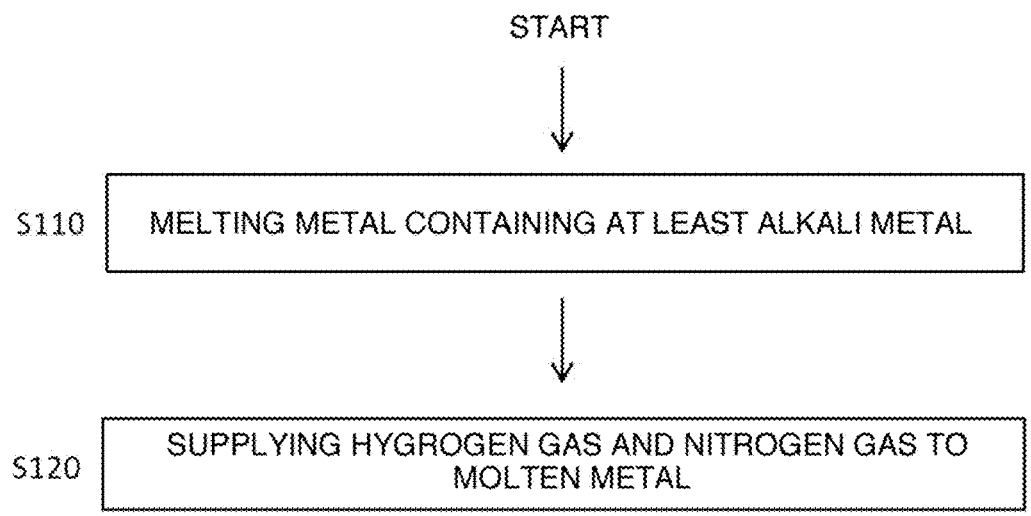
FIG. 1 is a flow chart of the steps of synthesizing ammonia according to the present invention.

FIG. 1 is a flow chart of the steps of synthesizing ammonia of the present invention.

In "Step S110," a metal containing at least an alkali metal is melted.

The alkali metal is at least one metal selected from the group consisting of lithium, sodium, potassium, rubidium, cesium, and francium. In terms of availability and easy handling, the alkali metal is at least one metal selected from the group consisting of lithium, sodium, and potassium. The alkali metal further preferably contains at least sodium. Accordingly, the molten metal can safely function as a catalyst for ammonia synthesis. Since the alkali metal itself shows excellent reactivity with impurities such as oxygen and water in a source gas, high-purity ammonia can be synthesized.

Although it is sufficient that the molten metal contains at least an alkali metal, this may contain a metal such as gallium and indium other than the alkali metal. When the molten metal contains gallium or indium, an effect of inhibiting evaporation of the above alkali metal (particularly, sodium) contained therein can be provided. The content (by volume %) of the above alkali metal in the metal may be 30 volume % or more. When the content is below 30 volume %, the alkali metal may function poorly as a catalyst and ammonia cannot be generated sufficiently in some cases.

In Step S110, the heating temperature for melting the metal depends on the melting point of a selected metal. For example, the metal is melted by heating to a temperature range from 100° C. or higher to 880° C. or lower, preferably from 400° C. or higher to 700° C. or lower.

In Step S110, melting the metal and stirring the molten metal may be performed at the same time. This creates a flow in the molten metal and makes a hydrogen gas and a nitrogen gas which are supplied in "Step S120" described below into small bubbles. As a result, efficiency of ammonia production can be improved.

In "Step S120," the hydrogen gas and the nitrogen gas are supplied to the molten metal. By doing this, the nitrogen gas is brought in contact with a metal containing at least an alkali metal to become a radical or an ion, thereby being activated. The activated nitrogen (nitrogen radical (N*) or nitrogen ion ($N^{3-}$)) reacts with the hydrogen gas, and ammonia can be synthesized under atmospheric pressure without the need for any pressure control. The reaction formulae in this case are as follows.

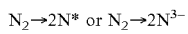
$N_2 \rightarrow 2N^*$ or $N_2 \rightarrow 2N^{3-}$

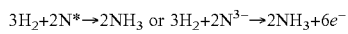
$3H_2 + 2N^* \rightarrow 2NH_3$ or $3H_2 + 2N^{3-} \rightarrow 2NH_3 + 6e^-$ The hydrogen gas and the nitrogen gas are supplied so that they satisfy a volume ratio ranging from 2:98 to 98:2. By setting the volume ratio in this range, ammonia is synthesized. Preferably, the hydrogen gas and the nitrogen gas are supplied so that they satisfy a volume ratio ranging from 25:75 to 90:10. By setting the volume ratio in this range, ammonia is synthesized efficiently. The hydrogen gas and the nitrogen gas may be supplied in a mixture form or may be supplied from separate supply sources.

The hydrogen gas and the nitrogen gas which are supplied preferably have a high purity. However, even if these gases contain impurities such as oxygen and water, the impurities easily react with an alkali metal in the metal and are consequently removed. Thus, high-purity ammonia can be synthesized by the method for synthesizing ammonia according to the present invention. The hydrogen gas and the nitrogen gas which are supplied preferably have purity of 97% or more as a total purity of hydrogen and nitrogen included in the gases.

The flow rates of the gases to be supplied are not particularly limited. However, the higher the flow rates, the faster the synthesizing speed of ammonia. The flow rates can be appropriately set by a person skilled in the art according to a size of an apparatus.

The hydrogen gas and the nitrogen gas are preferably supplied in the form of bubbles in Step S120 while stirring the molten metal in Step S110. By doing this, the gases supplied in the form of bubbles are brought in contact with the flowing molten metal and become extremely fine bubbles having the order of nanometers to micrometers (which is hereinafter simply referred to as "fine bubbles"). By forming such fine bubbles, internal pressures of the bubbles are increased and the above-described reaction is promoted. The fine bubbles not only have an increased surface area for reacting with the molten metal, but also remain in the molten metal for a longer time. Therefore, the overall reaction efficiency is improved.

In Step S120, although ammonia can be synthesized by supplying the gases under atmospheric pressure, the gases can be also supplied under pressure in a range from 1 atmosphere or more to less than 200 atmospheres. Accordingly, ammonia synthesis is further promoted. The gases are preferably supplied under pressure in a range from 1 atmosphere or more to 20 atmospheres or less. Thus, a specific high-pressure equipment that is necessary for the conventional method in which synthesis is performed under high pressures is not required, and thus ammonia can be synthesized at a low cost and in a highly efficient way. The gases are further preferably supplied under pressure in a range from more than 1 atmosphere to 20 atmospheres or less.

When the metal is heated at a temperature range from higher than 530° C. to 600° C. or lower in Step S110 and the hydrogen gas and the nitrogen gas are supplied under a pressure of 1 atmosphere in Step S120, even if an alkali metal reacts with the hydrogen gas to produce an alkali metal hydride, this hydride is decomposed and the production of the hydride is thus inhibited. This is particularly effective when the alkali metal is sodium. When the pressure is approximately from more than 1 atmosphere to 20 atmospheres or less, ammonia can be synthesized efficiently even if an upper limit of the temperature is set at 700° C. or less. This is because as the pressure increases, the evaporation of sodium is inhibited and decomposition of the synthesized ammonia can be inhibited.

Accordingly, the heating temperature for the metal in Step S110 and the pressure in Step S120 are preferably set as appropriate within a temperature range from 100° C. or higher to 880° C. or lower and within a pressure range from 1 atmosphere or more to less than 200 atmospheres, respectively, to inhibit the evaporation of a selected metal and the decomposition of the synthesized ammonia.

The step of cooling and collecting the generated gas may be further performed subsequent to Step S120. Although ammonia is synthesized in the form of gas, the generated gas contains an unreacted hydrogen gas and/or nitrogen gas in addition to ammonia. When the gas containing these gases is cooled, ammonia is extracted in the form of liquid.

The step of recovering the evaporated alkali metal and/or the reaction product (specifically, an alkali metal hydride) of the alkali metal and the hydrogen gas may be performed subsequent to Step S120 at the same time as the above collecting step, or separately from the above collecting step. For example, a molten metal is partly vaporized (evaporated) and can be contained in the synthesized gas. However, when the gas is cooled down to about 200° C. or less, only a metal component is collected and recovered in the form of liquid by a cold trap or the like. Therefore, the higher purity ammonia can be obtained. The liquid metal and the liquid ammonia have a different specific gravity, and thus can be easily separated from each other without being mixed. The alkali metal hydride is in the form of powder, and thus can be separated by filtration, for example.

Next, an apparatus for synthesizing ammonia of the present invention will be described.

Figure 2:
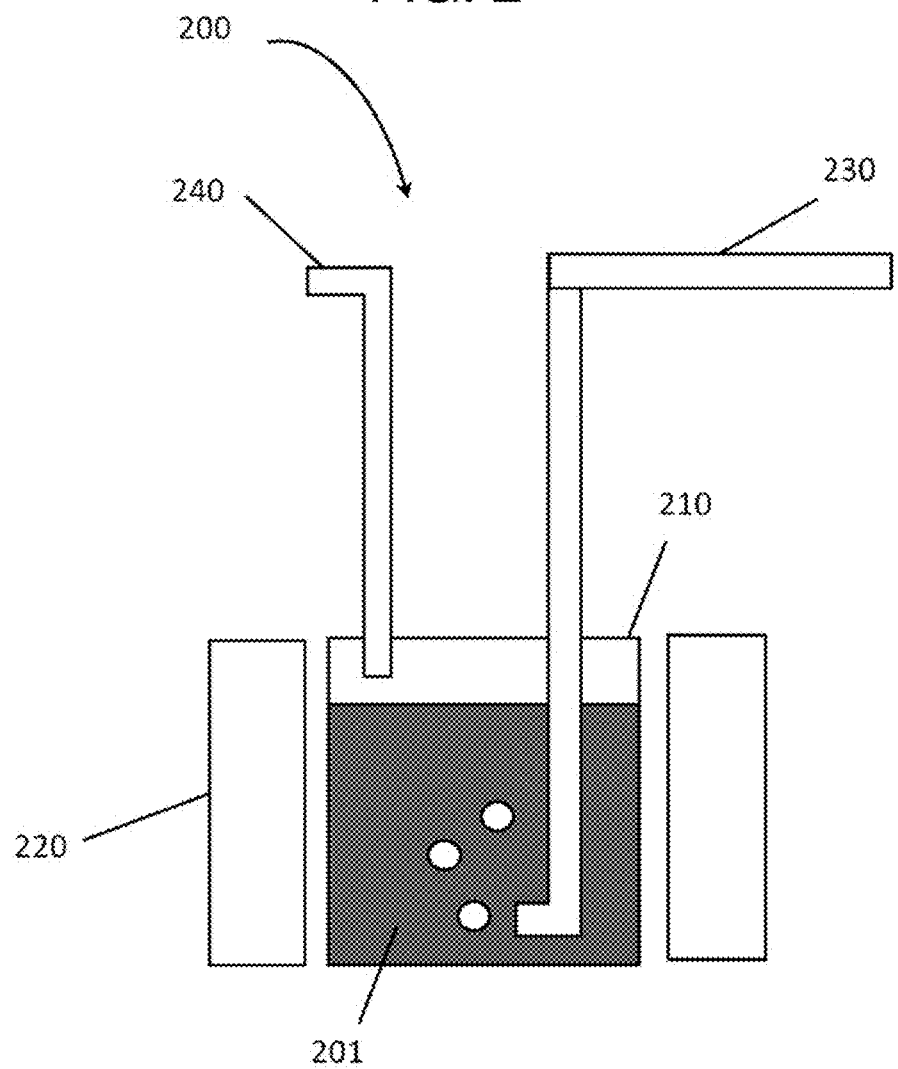
FIG. 2 is a schematic diagram of the apparatus for synthesizing ammonia according to the present invention.

FIG. 2 is a schematic diagram of the apparatus for synthesizing ammonia according to the present invention.

An apparatus 200 for synthesizing ammonia according to the present invention includes a vessel 210 for keeping a metal 201 containing at least an alkali metal, a heating means 220 for heating the vessel 210 to melt the metal 201 kept in the vessel 210, and a gas supplying means 230 for supplying a hydrogen gas and a nitrogen gas to the molten metal 201. As the metal 201 is described with reference to FIG. 1 as above, a description thereof is omitted.

The vessel 210 preferably has no reactivity or low reactivity with the metal 201. The vessel 210 is made of, for example, an inorganic material selected from the group consisting of boron nitride (BN), alumina ($Al_2O_3$), calcia (CaO), and yttria ($Y_2O_3$), or iron, titanium, chromium, or a metal containing these. These materials have no reactivity or low reactivity with the metal 201. Among the above materials, boron nitride (BN) is preferable as it hardly breaks.

The heating means 220 is not particularly limited as long as the heating means is a means that can heat the vessel 210 to melt the metal 201, and is selected from the group consisting of resistance heating, light-concentrating heating, radio-frequency heating, and combustion heating, for example. These heating means are commercially available and easy to obtain, and also capable of heating up to approximately 1000° C. to melt at least an alkali metal.

The vessel 210 can be housed in a high-pressure equipment (not shown) that controls pressures in the vessel 210. This allows the pressure in the vessel 210 to be controlled within the range from 1 atmosphere or more to less than 200 atmospheres, and the ammonia synthesis is therefore further promoted.

Preferably, the apparatus 200 further includes a stirring means (not shown) for stirring the metal 201 that has been melted by the heating means 220. Examples of the stirring means include a rotary shaker for shaking the vessel 210, a stirring blade or a stirring rod positioned in the molten metal 201, and the like. By stirring the molten metal, a flow is created in the molten metal 201, and the hydrogen gas and the nitrogen gas which are supplied from the gas supplying means 230 become small bubbles, thereby improving efficiency of ammonia production. For example, when the stirring blade is used, the supplying gas can be physically cut with the stirring blade to make it into small bubbles.

Preferably, the apparatus 200 further includes a bubbling means (not shown) for supplying a hydrogen gas and a nitrogen gas in the form of bubbles. The bubbling means can be used without a particular limitation as long as it is a bubbler that can blow the above-mentioned hydrogen gas and the above-mentioned nitrogen gas out as fine bubbles or a means for further micronizing bubbles of the hydrogen gas and the nitrogen gas, which generated in the molten metal 201. For example, when the bubbling means is a bubbler, the bubbler may be provided in the gas supplying means 230. With such a bubbling means, the hydrogen gas and the nitrogen gas in the form of bubbles are brought in contact with the flowing molten metal 201 and become extremely fine bubbles (fine bubbles) having the order from nanometers to micrometers. By generating such fine bubbles, internal pressures of the bubbles are increased and the above-described reaction is promoted. The fine bubbles not only have an increased surface area for reacting with the molten metal, but also remain in the molten metal for a longer time. Therefore, the overall reaction efficiency is improved.

Although the apparatus 200 synthesizes ammonia in accordance with the configurations as described above, the apparatus 200 can further include one or more recovery tanks (not shown) for collecting synthesized ammonia, a vaporized metal, and a reaction product of the alkali metal and the hydrogen gas (an alkali metal hydride). For example, a collecting pipe 240 for collecting a synthesized gas is included in FIG. 2. However, the collecting pipe 240 may be connected to a recovery tank (not shown). The synthesized gas contains an unreacted hydrogen gas, nitrogen gas, and a vaporized metal in addition to ammonia. The synthesized gas containing the above are cooled in the recovery tank (not shown) and are then subjected to filtration, filtering, or pressurization, as necessary, so that only ammonia can be extracted. The recovered metal and the like may be reused.

As described above, in the method according to the present invention and the apparatus for synthesizing ammonia according to the present invention, ammonia can be synthesized even under atmospheric pressure by the use of at least an alkali metal as a catalyst without the need for using a specific high-pressure equipment that is necessary for performing the conventional method for synthesizing ammonia under high pressures, thereby reducing a production cost and an apparatus cost. Further, by the use of at least an alkali metal as a catalyst, oxygen and water like impurities easily react with the catalyst, and therefore high-purity ammonia can be synthesized.

Next, the present invention will be described in detail using specific examples. However, note that the present invention is not limited to Examples.

EXAMPLES

Example 1

In Example 1, ammonia was synthesized by the use of sodium (Na) as an alkali metal.

Figure 3:
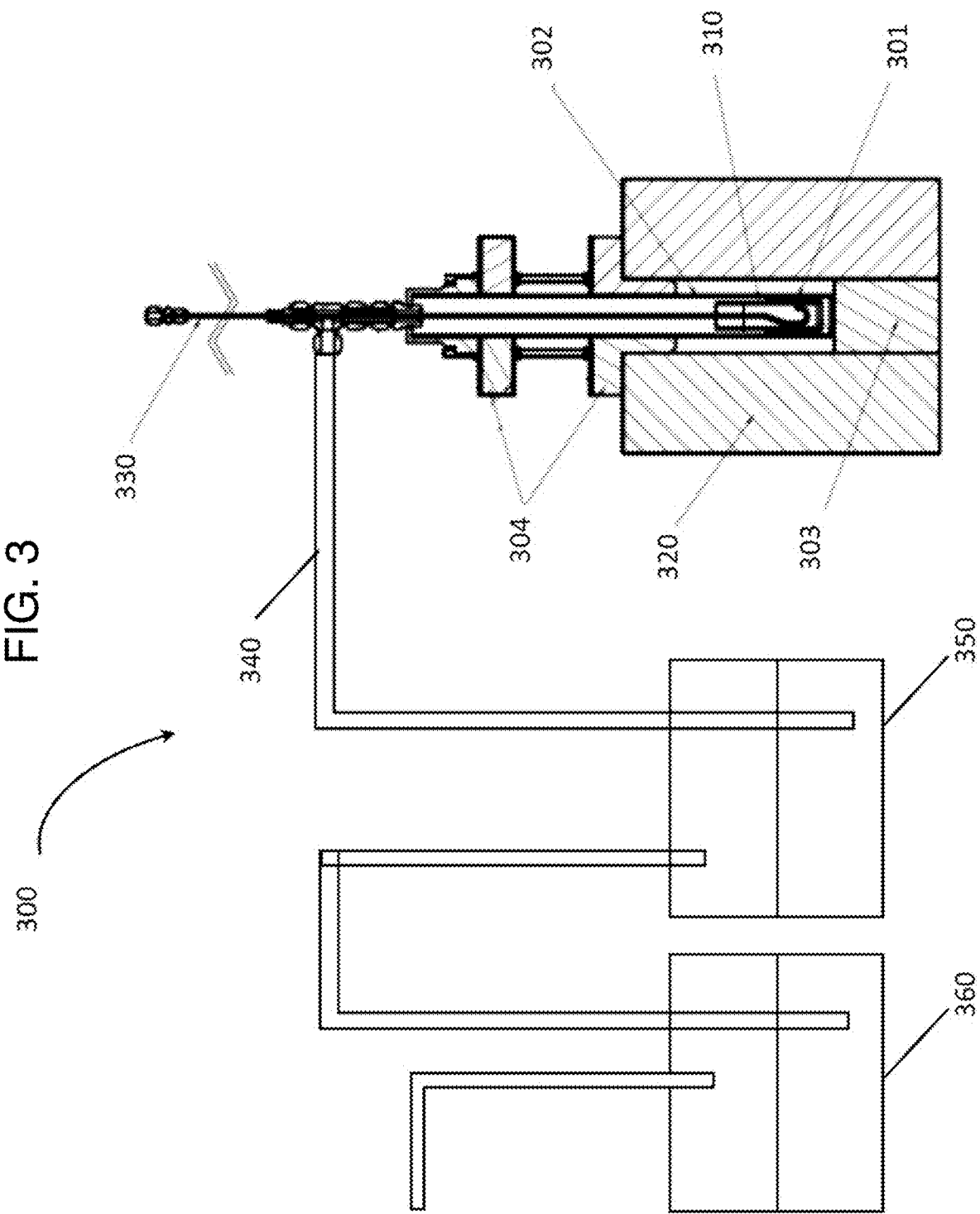
FIG. 3 is a schematic diagram of the apparatus for synthesizing ammonia used in Example 1.

FIG. 3 is a schematic diagram of an apparatus for synthesizing ammonia, used in Example 1.

An apparatus 300 includes a crucible 310 which is made of boron nitride (a BN crucible) as a vessel for keeping at least sodium (Na) as an alkali metal, an electric tube furnace 320 as a heating means for heating the BN crucible 310, and a gas supplying means 330 for supplying a mixture of a hydrogen gas and a nitrogen gas to sodium. The gas supplying means 330 is connected to a cylinder (not shown) of the hydrogen gas and the nitrogen gas.

The BN crucible 310 is housed in a case 301 made of boron nitride, and the case 301 made of boron nitride is further housed in a quartz pipe 302. The quartz pipe 302 housing the BN crucible 310 is placed on a heat insulating material 303 and fixed with another heat insulating material 304 covering an upper part of the quartz pipe 302. The hydrogen gas and the nitrogen gas which are supplied from the gas supplying means 330 are supplied to sodium through a bubbling tube.

The apparatus 300 further includes a collecting pipe 340 for collecting a generated gas. To the collecting pipe 340, a first recovery tank 350 and a second recovery tank 360 are connected to perform multistage collection. In this Example, pure water was stored in the first recovery tank 350 and the second recovery tank 360, and ammonia was dissolved in the pure water and then collected.

A specific procedure will be described. Metallic sodium (manufactured by METAUX SPECIAUX), purity of 99.99%, 20 g) was sealed in the BN crucible 310, which was heated to 570° C. to melt (Step S110 in FIG. 1). After heating to melt metallic sodium, the hydrogen gas and the nitrogen gas were supplied to molten sodium (Step S120 in FIG. 1). A purity of the hydrogen gas and the nitrogen gas was 99.9% and 99.9%, respectively. These gases contained oxygen and water as impurities. The hydrogen gas and the nitrogen gas were supplied so as to satisfy hydrogen gas: nitrogen gas=4: 96 (by volume ratio). A gas flow rate of a mixed gas of the hydrogen gas and the nitrogen gas was 400 sccm, and a supplying time was 20 minutes. A pressure in the BN crucible 310 was at atmospheric pressure (1 atmosphere).

TABLE 1

Conditions for synthesizing ammonia in Example 1

| Example | Alkali metal | Heating temperature (° C.) | Hydrogen: Nitrogen (Volume ratio) | Pressure (atmosphere) |
|---|---|---|---|---|
| Example 1 | Na | 570 | 4:96 | 1 |

For simplicity, experiment conditions are shown in Table 1. In this experiment, using the molten sodium as a catalyst, ammonia was synthesized through the reaction proceeded as represented by the following reaction formulae.

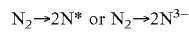

$N_2 \rightarrow 2N^*$ or $N_2 \rightarrow 2N^{3-}$

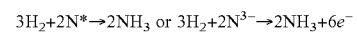

$3H_2 + 2N^* \rightarrow 2NH_3$ or $3H_2 + 2N^{3-} \rightarrow 2NH_3 + 6e^-$

Next, an exhaust gas after bubbling was collected in the pure water of the first recovery tank 350 and the second recovery tank 360 through the collecting pipe 340. A solution recovered from each recovery tank was subjected to ion chromatography. The results are shown in FIG. 4 and FIG. 5.

Figure 4:
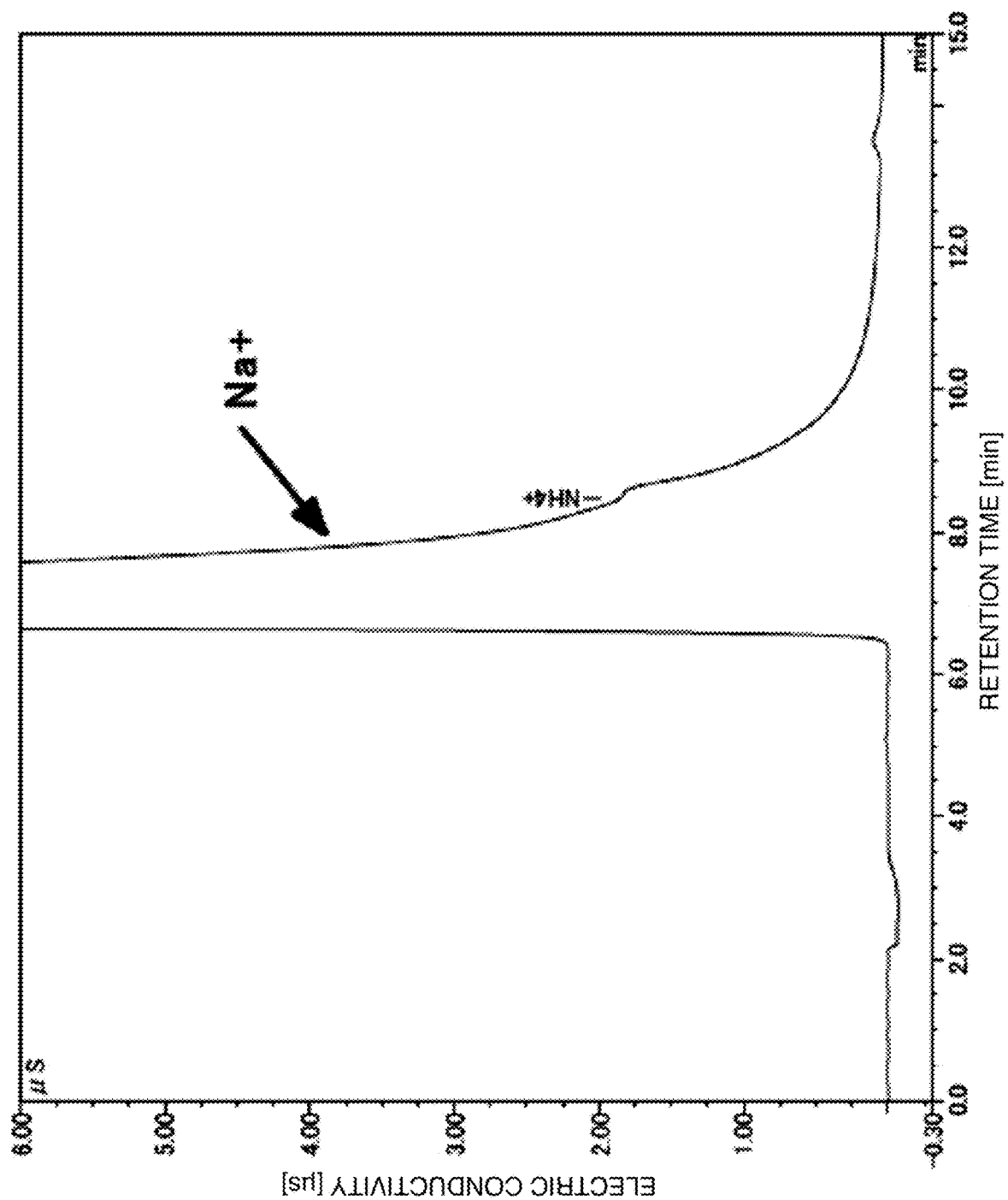
FIG. 4 is a result of ion chromatography performed on the solution recovered from a first recovery tank in Example 1.

FIG. 4 is a result of the ion chromatography performed on the solution recovered from the first recovery tank.

Figure 5:
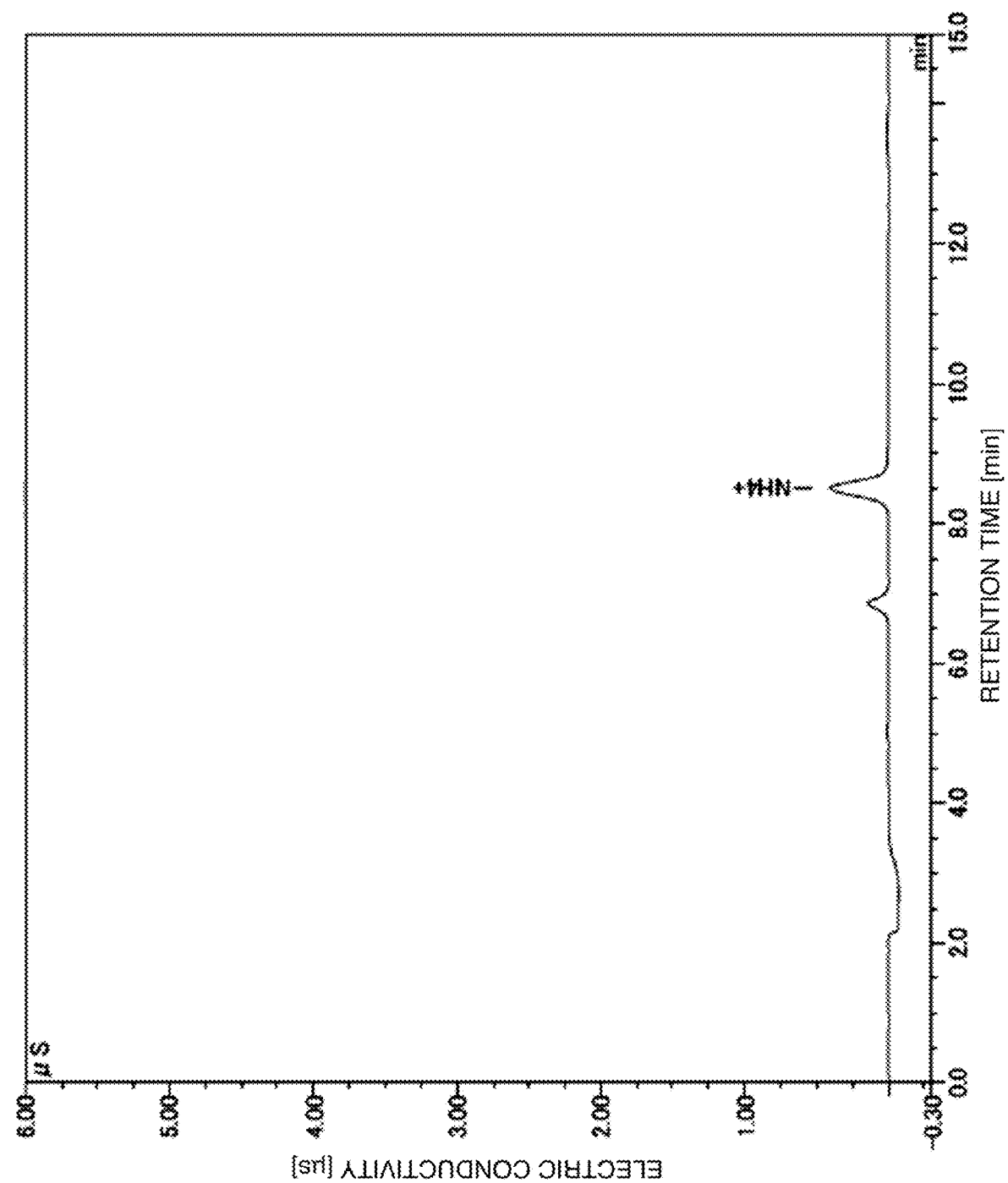
FIG. 5 is a result of the ion chromatography performed on the solution recovered from a second recovery tank in Example 1.

FIG. 5 is a result of the ion chromatography performed on the solution recovered from the second recovery tank.

As shown in both FIG. 4 and FIG. 5, a peak of an $NH_4^+$ ion was observed, which indicates that ammonia was produced and dissolved in water. Thus, from these results, it was demonstrated that in the method according to the present invention and the apparatus according to the present invention, shown in FIG. 1, an alkali metal functioning as a catalyst caused a generation of a nitrogen radical or nitrogen ion, and the use of high reactivity of the generated nitrogen radical or nitrogen ion made ammonia synthesis possible even under atmospheric pressure.

In FIG. 4, a remarkable peak of Na and a peak of $NH_4^+$ were shown. From this result, it was found that the solution recovered from the first recovery tank 350 contained a large amount of evaporated sodium as well as ammonia. In FIG. 5, on the other hand, a very small peak of Na and a clear peak of $NH_4^+$ were shown. From this result, it was demonstrated that by performing the multistage collection, most of evaporated sodium was removed in the first recovery tank 350 and a large amount of ammonia was collected by the solution recovered from the second recovery tank 360.

It was found that a concentration of oxygen impurities in each solution recovered from the first recovery tank 350 or the second recovery tank 360 was below the limit of measurement. From this result, it was demonstrated that in the method according to the present invention and the apparatus according to the present invention, shown in FIG. 1 high-purity ammonia could be synthesized by the use of an alkali metal as a catalyst.

Example 2

In Example 2, sodium (Na) was used as an alkali metal to synthesize ammonia using the same apparatus as in Example 1 except that in order to confirm the influence of evaporated sodium, a Na cold trap (not shown) for recovering vaporized Na was provided prior to the first recovery tank 350 (FIG. 3), and a methanesulfonic acid solution was stored in the second recovery tank 360. Further, ammonia was synthesized in the same conditions as in Example 1 except that the gas flow rate of the mixed gas was 200 sccm, the supplying time was 20 minutes, and the temperature was set at 500° C., 530° C., 560° C., 590° C., and 620° C. For simplicity, experimental conditions are shown in Table 2.

TABLE 2

Conditions for synthesizing ammonia in Example 2

| Conditions | Alkali metal | Heating temperature (° C.) | Hydrogen: Nitrogen (Volume ratio) | Pressure (atmospheres) |
|---|---|---|---|---|
| Condition 1 | Na | 500 | 4:96 | 1 |
| Condition 2 | Na | 530 | 4:96 | 1 |
| Condition 3 | Na | 560 | 4:96 | 1 |
| Condition 4 | Na | 590 | 4:96 | 1 |
| Condition 5 | Na | 620 | 4:96 | 1 |

The exhaust gas after bubbling was collected in the methanesulfonic acid solution stored in the second recovery tank 360 through the collecting pipe 340 in the same manner as in Example 1. The solution recovered from the recovery tank was subjected to ion chromatography. The result is shown in FIG. 6.

Figure 6:
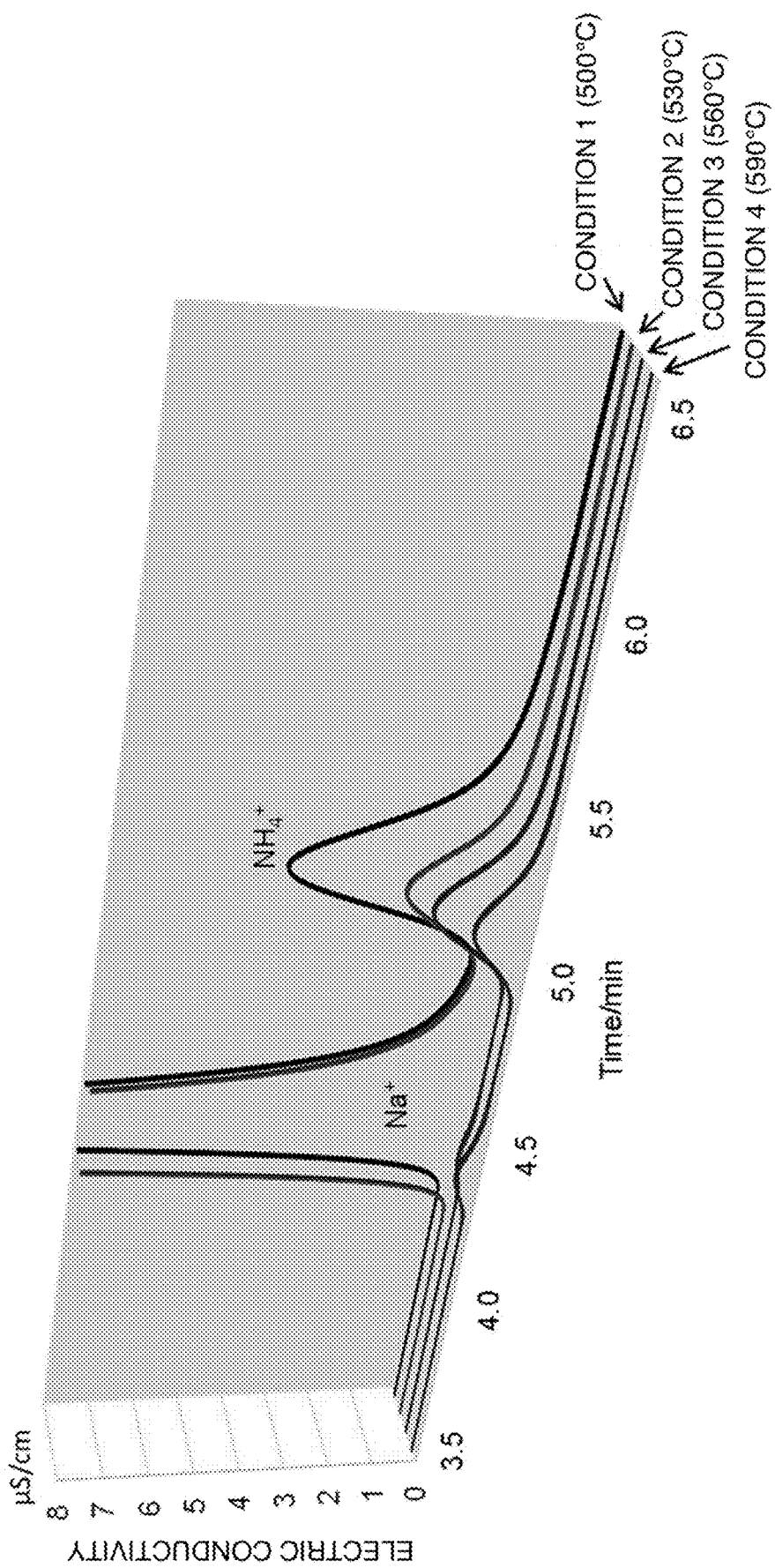
FIG. 6 is a result of the ion chromatography performed on the solution recovered from a second recovery tank in Example 2.

FIG. 6 is a result of the ion chromatography performed on the solution recovered from the second recovery tank.

According to FIG. 6, a peak of an $NH_4^+$ ion was observed, which indicates that ammonia was produced in every condition and dissolved in a recovery solution of the second recovery tank 360. From this result, it was demonstrated that in the method according to the present invention and the apparatus according to the present invention, shown in FIG. 1, an alkali metal functioning as a catalyst caused a generation of a nitrogen radical or nitrogen ion, and the use of high reactivity of the generated nitrogen radical or nitrogen ion made ammonia synthesis even under atmospheric pressure possible.

It is worthy of note that when the temperature was 530° C. or lower as in Conditions 1 and 2, a remarkable peak of Na was shown even though the Na cold trap was provided. This demonstrates that a sodium hydride was produced other than evaporated sodium. On the other hand, when the temperature was higher than 530° C. as in Conditions 3 and 4, a peak of Na was substantially disappeared. This demonstrates that the sodium hydride was decomposed and the production of the sodium hydride was inhibited when the temperature range was higher than 530° C. When the temperature was 620° C. as in Condition 5 (not shown), an elevation of a Na peak was shown again. However, it is considered that this was caused by the production of a sodium hydride resulted from a reaction between vaporized (evaporated) sodium and unreacted hydrogen occurred in a low-temperature area in the synthesizing apparatus of 530° C. or lower. Accordingly, in consideration of the evaporation of Na, it is better to set the upper limit of the temperature at 600° C.

Example 3

In Example 3, ammonia was synthesized in the same conditions as in Condition 3 of Example 2 using the same apparatus as in Example 2 except that the apparatus was provided with a stirring blade as the stirring means and a bubbler made of porous ceramics as the bubbling means. When a hydrogen gas and a nitrogen gas were supplied through the bubbler, a formation of fine bubbles was visually observed. When compared to Condition 3 of Example 2, a peak intensity of an $NH_4^+$ ion in Example 3 was increased (not shown).

Based on the above, it was demonstrated that ammonia can be synthesized at 1 atmosphere (atm), and also, setting the temperature range from higher than 530° C. to 600° C. or lower at the time of synthesizing can inhibit the production of an alkali metal hydride. Thus, it was demonstrated that, for example, ammonia can be synthesized without a specific high-pressure equipment used in the conventional method and the recovery tank for recovering an alkali metal hydride can be omitted. Further, it was demonstrated that these effects can be obtained by using sodium that is easy to obtain and handle as an alkali metal. Moreover, it was demonstrated that ammonia synthesis is promoted by stirring a molten metal and supplying gases in the form of bubbles.

INDUSTRIAL APPLICABILITY

With the method for synthesizing ammonia according to the present invention, ammonia can be provided at a low cost since ammonia can be synthesized efficiently even under atmospheric pressure as compared to ammonia synthesis performed by the Haber-Bosch process. The method and the apparatus of the present invention can be used in various fields in need of ammonia (storage and transportation of hydrogen by ammonia, a source of fuel gas supply for fuel cells and gas turbines using ammonia, synthesis of chemicals, fertilizers, and the like).

REFERENCE SIGNS LIST 200, 300 Apparatus for synthesizing ammonia
201 Alkali metal
210, 310 Vessel
220, 320 Heating means
230, 330 Gas supplying means
240, 340 Collecting pipe
350 First recovery tank
360 Second recovery tank

The invention claimed is:
1. A method for synthesizing ammonia, comprising:
heating a metal containing at least an alkali metal, wherein the alkali metal contains at least sodium, thereby melting the metal containing the at least the alkali metal; and
supplying a hydrogen gas and a nitrogen gas to the molten metal, thereby synthesizing the ammonia, wherein the nitrogen gas in contact with the molten metal is radicalized or ionized, and the radicalized or ionized nitrogen gas reacts with the hydrogen gas, thereby synthesizing the ammonia.

2. The method according to claim 1, wherein the alkali metal further contains at least one metal selected from the group consisting of lithium, potassium, rubidium, cesium, and francium.

3. The method according to claim 1, wherein a volume ratio of the hydrogen gas to the nitrogen gas is in a range from 2:98 to 98:2.

4. The method according to claim 3, wherein the volume ratio is in a range from 25:75 to 90:10.

5. The method according to claim 1, wherein the supplying is performed under a pressure in a range from 1 atmosphere or more to less than 200 atmospheres.

6. The method according to claim 5, wherein the supplying step is performed under a pressure in a range from 1 atmosphere or more to less than 20 atmospheres.

7. The method according to claim 1, further comprising a step of cooling and collecting a gas generated in the supplying step.

8. The method according to claim 1, wherein the heating is performed by melting the metal at a temperature higher than 530° C. and 600° C. or lower, and the supplying step is performed under a pressure of 1 atmosphere.

9. The method according to claim 1, wherein the heating comprises melting the metal and stirring the molten metal.

10. The method according to claim 9, wherein the supplying is performed by supplying the hydrogen gas and the nitrogen gas in the form of bubbles.

11. The method according to claim 1, further comprising recovering an evaporated alkali metal and/or a reaction product of the alkali metal and the hydrogen gas.

12. The method according to claim 1, wherein the heating is performed by melting the metal at a temperature higher than 530° C. and 600° C. or lower.

13. The method according to claim 1, wherein the supplying is performed under a pressure of 1 atmosphere.

14. The method according to claim 1, wherein the nitrogen gas in contact with the molten metal is radicalized.

15. The method according to claim 1, wherein the nitrogen gas in contact with the molten metal is ionized.

* * * * *